US012469970B1

(12) United States Patent
Alwan et al.

(10) Patent No.: US 12,469,970 B1
(45) Date of Patent: Nov. 11, 2025

(54) MULTIBAND ANTENNA SYSTEM

(71) Applicants: Elias Antoun Alwan, Miami, FL (US); Md Nazim Uddin, Miami, FL (US)

(72) Inventors: Elias Antoun Alwan, Miami, FL (US); Md Nazim Uddin, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/214,806

(22) Filed: May 21, 2025

(51) Int. Cl.
*H01Q 5/25* (2015.01)
*H01Q 5/30* (2015.01)
*H01Q 9/04* (2006.01)
*H01Q 9/44* (2006.01)
*H01Q 13/10* (2006.01)
*H01Q 21/06* (2006.01)

(52) U.S. Cl.
CPC ................. *H01Q 5/25* (2015.01); *H01Q 5/30* (2015.01); *H01Q 9/0414* (2013.01); *H01Q 9/0421* (2013.01); *H01Q 9/44* (2013.01); *H01Q 13/10* (2013.01); *H01Q 21/064* (2013.01); *H01Q 21/065* (2013.01)

(58) Field of Classification Search
CPC .......... H01Q 5/25; H01Q 5/30; H01Q 9/0414; H01Q 9/0421; H01Q 9/44; H01Q 13/10; H01Q 21/064; H01Q 21/065
See application file for complete search history.

(56) References Cited

U.S. PATENT DOCUMENTS

2022/0094053 A1* 3/2022 Jiang ........................ H01Q 5/42
2024/0305014 A1* 9/2024 Huang ................. H01Q 9/0414

FOREIGN PATENT DOCUMENTS

WO WO-2021049679 A1 * 3/2021 ............... H01Q 5/50

* cited by examiner

*Primary Examiner* — Dieu Hien T Duong
(74) *Attorney, Agent, or Firm* — SALIWANCHIK, LLOYD & EISENSCHENK

(57) ABSTRACT

An extremely wideband reconfigurable antenna system is provided, including a plurality of planar inverted-F antennas, operating in a frequency range of 0.5 GHz to 4 GHz; a plurality of square patch antennas, operating in a frequency range of 4 GHz to 10 GHz; a plurality of circular patch antennas, operating in a frequency range of 10 GHz to 40 GHz; a plurality of multilayer stacked-up folded antennas, operating in a frequency range of 40 GHz to 110 GHz; a plurality of square patch antennas including a plurality of Jerusalem cross elements, operating in a frequency range of 110 GHz to 170 GHz; and a plurality of subarrays of horn-like tapered slot antennas, operating in a frequency range of 170 GHz to 300 GHz.

18 Claims, 9 Drawing Sheets

| Antenna Type | Frequency Range | Frequency Tuning |
|---|---|---|
| Single PIFA | 2 – 4 GHz | Aperture Tuner A1 |
| PIFA Combined | 0.5 – 2 GHz | Connect Switch S1, S2, S3 and S4 |
| Single Patch | 8 -10 GHz | Tunable Varactor |
| Patch Combined | 4 -10 GHz | Connect switch d1, d3, d3 and d4 |
| Circular Patch | 35 - 40 GHz | Tunable Varactor |
| Circular Patch Combined | 10 – 40 GHz | Connect C1 to C10 |

Substrate : Rogers 5880 ($\varepsilon_r$ = 2.2 , Thickness 1.5 mm)

| Frequency | Substrate | Thickness | Technology | Antenna Type |
|---|---|---|---|---|
| 0.5 - 40 GHz | Rogers 5880 | 1.5 mm | PCB | PIFA, Patch, Circular patch with slot |
| 40 ~ 110 GHz | RO4450F | 0.12 mm | PCB | Folded Strip Antenna |
| 110 ~ 170 GHz | Glass | 0.1 mm | Antenna in Package | Jerusalem Cross |
| 170 ~ 300 GHz | All Metal | 0.5 mm | Laser | Slot Antenna |

FIG. 1(c)

| Antenna Type | Frequency Range | Frequency Tuning |
|---|---|---|
| Single PIFA | 2 – 4 GHz | Aperture Tuner A1 |
| PIFA Combined | 0.5 – 2 GHz | Connect Switch S1, S2, S3 and S4 |
| Single Patch | 8 -10 GHz | Tunable Varactor |
| Patch Combined | 4 -10 GHz | Connect switch d1, d1, d3 and d4 |
| Circular Patch | 35 - 40 GHz | Tunable Varactor |
| Circular Patch Combined | 10 – 40 GHz | Connect C1 to C10 |

Substrate : Rogers 5880 ($\varepsilon_r$ = 2.2 , Thickness 1.5 mm)

| Antenna Type | Frequency Range | Frequency Tuning |
|---|---|---|
| Single Folded Strip | 90 – 110 GHz | High Bandwidth Antenna |
| Folded Strip Combined | 40 – 90 GHz | Connect Switch P1, P64 |

Substrate: RO4450F ($\varepsilon_r$ = 3.52,

Thickness 0.12 mm)

- ➢ Aperture Feeding
- ➢ Coplanar Waveguide

110 – 170 GHz

| Antenna Type | Frequency Range | Frequency Tuning |
|---|---|---|
| Single Patch with Jerusalem Cross | 140– 170 GHz | High Bandwidth Antenna |
| Combined | 110– 140 GHz | Connect Switch J1, P64 |

Substrate: Glass ($\varepsilon_r$ = 5.9, Thickness = 0.1mm)

Critical Reason:

1. Coefficient of thermal expansion (CTE)
2. Surface Roughness due to sub-atomic skin depth at high frequency

| Antenna Type | Frequency Range |
|---|---|
| 1st Subarray | 170 -200 GHz |
| 2nd Subarray | 200 -230 GHz |
| 3rd Subarray | 230 – 260 GHz |
| 4th Subarray | 260 GHz- 300 GHz |

All Metal Antenna

SIW Feeding

Machining, Laser Cutting

MULTIBAND ANTENNA SYSTEM

BACKGROUND

UWB antennas suffer from low gain and efficiency in the operational frequency range. In addition, the UWB system needs a long signal acquisition time in the RF back end. Meanwhile, the high probability of interference limits the use of these antennas for applications where minor interference is considered a threat and must be avoided.

BRIEF SUMMARY

In order to address the limitations discussed in the Background, a reconfigurable aperture-sharing antenna system is required to optimize each antenna at each band separately. Embodiments of the subject invention provide novel and advantageous multiband antenna systems.

In an embodiment of the subject invention, a wideband reconfigurable antenna system is provided, comprising: a single substrate; a plurality of planar inverted-F antennas (PIFAs) integrated on the substrate, configured to operate within a frequency range of approximately 0.5 GHz to 4 GHz; a plurality of square patch antennas integrated on the substrate, configured to operate within a frequency range of approximately 4 GHz to 10 GHz; and a plurality of circular patch antennas integrated on the substrate, configured to operate within a frequency range of approximately 10 GHz to 40 GHz; wherein the plurality of PIFAs, the plurality of square patch antennas, and the plurality of circular patch antennas are configured in an aperture-in-aperture (AIA) configuration on the single substrate, enabling an operational frequency range of approximately 0.5 GHz to 40 GHz. The substrate is made of Rogers 5880 with a dielectric constant of approximately 2.2 and a thickness of approximately 1.5 mm. The antenna system may further comprise at least one PIN diode connecting adjacent PIFAs of the plurality of PIFAs operating in a frequency range of 2 GHz to 4 GHz. Moreover, the antenna system may further comprise an aperture tuner (AT) coupled to the plurality of PIFAs, configured to tune the operational frequency to a range of approximately 0.5 GHz to 2 GHz. In addition, the antenna system may further comprise at least one PIN diode connecting adjacent square patch antennas of the plurality of square patch antennas operating in a frequency range of approximately 8 GHz to approximately 10 GHz. The antenna system may further comprise a tunable varactor diode coupled to the plurality of square patch antennas, configured to tune the operational frequency to a range of approximately 4 GHz to approximately 8 GHz. The plurality of circular patch antennas includes a slot to enhance bandwidth and to accommodate demanding frequency range. The antenna system may further comprise at least one PIN diode connecting adjacent circular patch antenna elements of the plurality of circular patch antenna elements operating in a frequency range of approximately 35 GHz to approximately 40 GHz. The antenna system may further comprise a tunable varactor diode coupled to the plurality of circular patch antenna elements, configured to tune the operational frequency to a range of approximately 10 GHz to approximately 35 GHz. The antenna system can be configured to achieve an ultra-wide frequency ratio greater than 80.

In another embodiment of the subject invention, an extremely wideband reconfigurable antenna system is provided, comprising: a single substrate; a plurality of planar inverted-F antennas (PIFAs) integrated on the substrate, configured to operate within a frequency range of approximately 0.5 GHz to 4 GHz; a plurality of square patch antennas integrated on the substrate, configured to operate within a frequency range of approximately 4 GHz to 10 GHz; and a plurality of circular patch antennas integrated on the substrate, configured to operate within a frequency range of approximately 10 GHz to 40 GHz; a plurality of multilayer stacked-up folded antennas with at least two strip elements integrated on the substrate, configured to operate within a frequency range of approximately 40 GHz to 110 GHz; a plurality of square patch antennas comprising a plurality of Jerusalem cross elements integrated on the substrate, configured to operate within a frequency range of approximately 110 GHz to 170 GHz; and a plurality of subarrays of horn-like tapered slot antennas integrated on the substrate, configured to operate within a frequency range of approximately 170 GHz to 300 GHz. The substrate is made of Rogers 5880 with a dielectric constant of approximately 2.2 and a thickness of approximately 1.5 mm. The extremely wideband reconfigurable antenna system may further comprise at least one PIN diode connecting adjacent PIFAs of the plurality of PIFAs operating in a frequency range of 2 GHz to 4 GHz. Moreover, the extremely wideband reconfigurable antenna system may further comprise an aperture tuner (AT) coupled to the plurality of PIFAs, configured to tune the operational frequency to a range of approximately 0.5 GHz to 2 GHz. Furthermore, the extremely wideband reconfigurable antenna system may further comprise at least one PIN diode connecting adjacent square patch antennas of the plurality of square patch antennas operating in a frequency range of approximately 8 GHz to approximately 10 GHz. In addition, the extremely wideband reconfigurable antenna system may further comprise a tunable varactor diode coupled to the plurality of square patch antennas, configured to tune the operational frequency to a range of approximately 4 GHz to approximately 8 GHz. The plurality of circular patch antennas includes a slot to enhance bandwidth and to accommodate demanding frequency range. The extremely wideband reconfigurable antenna system may further comprise at least one PIN diode connecting adjacent circular patch antenna elements of the plurality of circular patch antenna elements operating in a frequency range of approximately 35 GHz to approximately 40 GHz. Moreover, the extremely wideband reconfigurable antenna system may further comprise a tunable varactor diode coupled to the plurality of circular patch antenna elements, configured to tune the operational frequency to a range of approximately 10 GHz to approximately 35 GHz. Furthermore, the extremely wideband reconfigurable antenna system may further comprise at least one PIN diode connecting adjacent multilayer stacked-up folded antennas of the plurality of the plurality of multilayer stacked-up folded antennas operating in a frequency range of approximately 40 GHz to approximately 110 GHz. IN addition, the extremely wideband reconfigurable antenna array may further comprise a plurality of PIN diodes connecting the plurality of square patch antennas comprising a plurality of Jerusalem cross elements, the PIN diodes being configured to reconfigure the operational frequency range within approximately 110 GHz to 170 GHz. The plurality of square patch antenna comprising a plurality of Jerusalem cross elements are integrated onto a glass substrate. The plurality of subarrays of horn-like tapered slot antennas are integrated onto a glass substrate. The plurality of subarrays of horn-like tapered slot antennas are fabricated by a laser-cutting method from a brass material. The extremely wideband reconfigurable antenna array may further comprise a reconfigurable substrate-integrated waveguide (SIW) to feed the subarray of horn-like tapered slot antennas. The plurality of subarrays of horn-like tapered slot antennas comprising: a first subarray configured to operate within a frequency range of approximately 170 GHz to 200 GHz; a second subarray configured to operate within a frequency range of approximately 200 GHz to 230 GHz; a third subarray configured to operate within a frequency range of approximately 230 GHz to 260 GHz; and a fourth subarray configured to operate within a frequency range of approximately 260 GHz to 300 GHz. Operations of the antenna system can be optimized by machine learning (ML) methods for full spectral diversity up to 300 GHz.

BRIEF DESCRIPTION OF DRAWINGS

FIG. 1(*b*) shows a 3D view of the visualization of the heterogenous AIA, according to an embodiment of the subject invention.

FIG. 1(*c*) shows the specifications of each antenna, according to an embodiment of the subject invention.

FIG. 1(*d*) shows the tunable operation from 0.5-300 GHz, according to an embodiment of the subject invention.

FIG. 1(*e*) shows the improved array gain using AIA concept for extremely wideband performance compared to UWB arrays, according to an embodiment of the subject invention.

DETAILED DESCRIPTION

Embodiments of the subject invention provide novel and advantageous wideband reconfigurable antenna systems.

Wideband Reconfigurable Antenna Systems

Figure 2A:
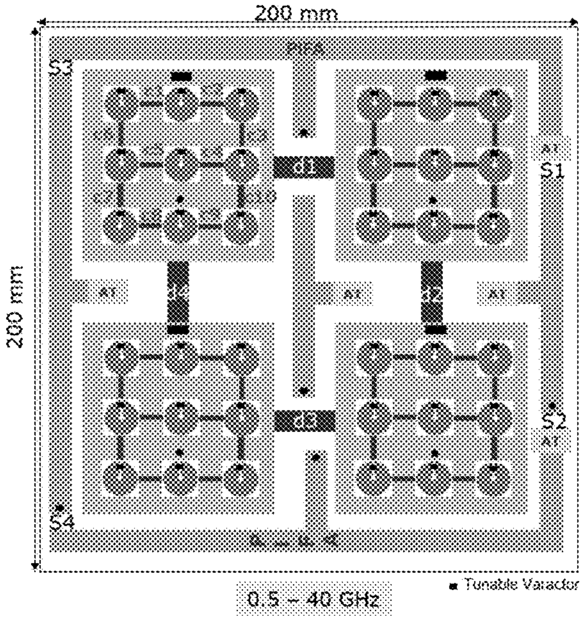
FIGS. 2(*a*)-2(*d*) show that the antennas are tunable and designed based on the available technology in each of these frequency bands: (a) 0.5-40 GHz, (b) 40-110 GHZ, (c) 110-170, and (d) 170-300 GHz, according to an embodiment of the subject invention.
Figure 2B:
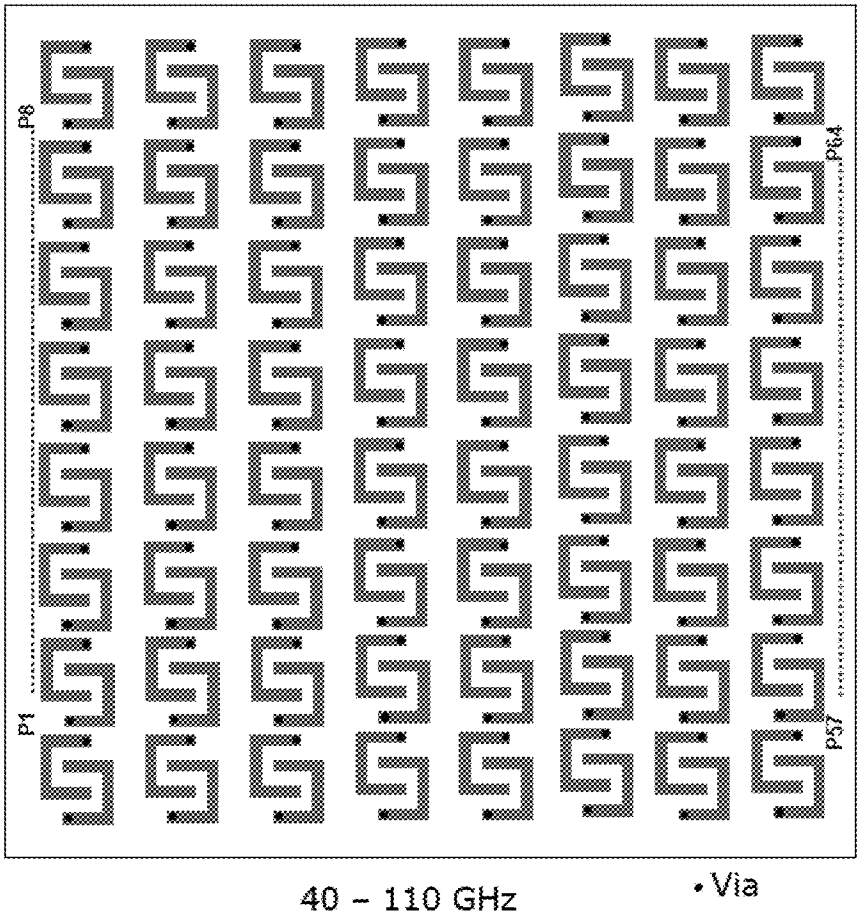
Figure 2C:
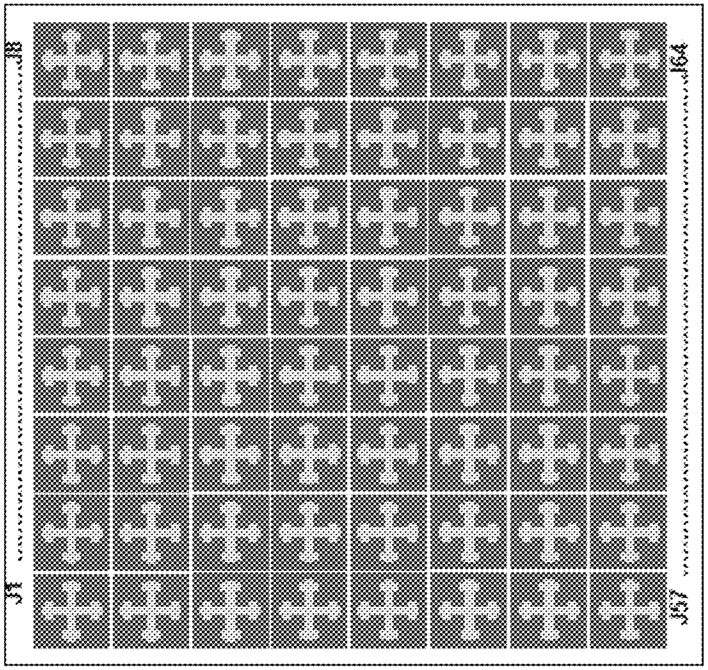
Figure 2D:
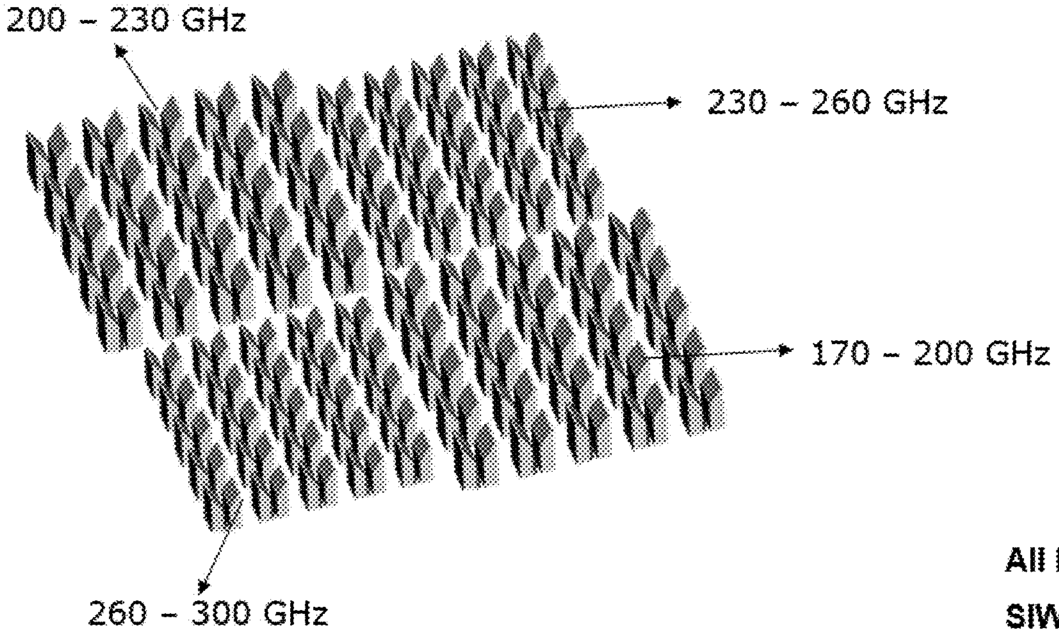

The multi-band aperture-in-aperture (AIA) system comprises antennas operating in UHF-band to Ka-band (0.5 GHz-40 GHz) on a single substrate. Referring to FIG. 2(*a*), the multi-band AIA system includes a plurality of PIFAs, a plurality of square patch antennas, and a plurality of circular patch antennas that works for ultrawideband operation from UHF to Ka-band based on tuning components. A substrate may be made of a material such as Rogers 5880 with a dielectric constant of 2.2 and a thickness of 1.5 mm.

The plurality of PIFAs are configured to operate in the 0.5 to 4 GHz range, with PIFAs being positioned on the structure's edge for 2-4 GHz operation. An integrated aperture tuner (AT) is coupled to the plurality of PIFAs, being configured to fine-tune the frequency of the PIFAs. Furthermore, a plurality of PIN diodes connecting the plurality of PIFAs allow for effectively tuning the frequency of the PIFAs across the range of 0.5 GHz to 2 GHz. This tuning mechanism expands the frequency band from UHF up to 4 GHz, overcoming the narrow bandwidth limitations of the traditional low-frequencies antennas.

In the 4 GHz to 10 GHz frequency range, the antenna system employs a plurality of square patch antennas, with a single patch dedicated to the 8-10 GHz frequency band. In addition, a tunable varactor diode is coupled to the plurality of square patch antennas, providing added flexibility by adjusting both the antenna loading and the frequency of operation.

Further enhancement can be achieved by integrating four square patches with a plurality of PIN diodes connecting them, expanding the operational range across a range of 4-8 GHZ, providing an overall tunability across the broader spectrum of 4-10 GHz.

A critical component in the antenna system of the subject invention is the plurality of circular patch antennas, designed to operate in the high-frequency range of 35-40 GHz. The inclusion of a slot within the circular patch antennas ensures not only high bandwidth but also the ability to accommodate the demanding frequency range. The plurality of PIN diodes connecting the plurality of circular patch antennas, configured to extend the operational frequency across a range of 10-35 GHz.

The embodiments of subject invention offer several key advantages, including:

1) integration of tunable wideband antenna with tuning components in the single aperture on the same substrate;
2) integration of a plurality of PIFAs, a plurality of circular patch antennas, and a plurality of square patch antennas;
3) integration of the PIFAs with an aperture tuner for wideband operation for UHF to Ka-band;
4) achieving an ultra-wide frequency ratio exceeding 80; and
5) achieving low power consumption and smaller size of the aperture, providing an excellent solution for future communication technologies.

The antenna system can be manufactured with PCB technology for cheap/low-cost mass production, making it ideal for commercial, military, and scientific applications. Compared to the conventional antennas, the multi-band antenna system of the subject invention eliminates the use of bulky and lossy circuits, reducing the power, cost, and size of front ends.

Extremely Wideband Reconfigurable Antenna System Based on the Aperture-In-Aperture Structure According to the embodiments of the subject invention, an extremely wideband reconfigurable antenna system based on the aperture-in-aperture structure is provided.

In the subject invention, the designs of the antenna system can be optimized by machine learning (ML) techniques and they are integrated onto a single platform based on the AIA structure to enable full spectral diversity up to 300 GHz.

Figure 1A:
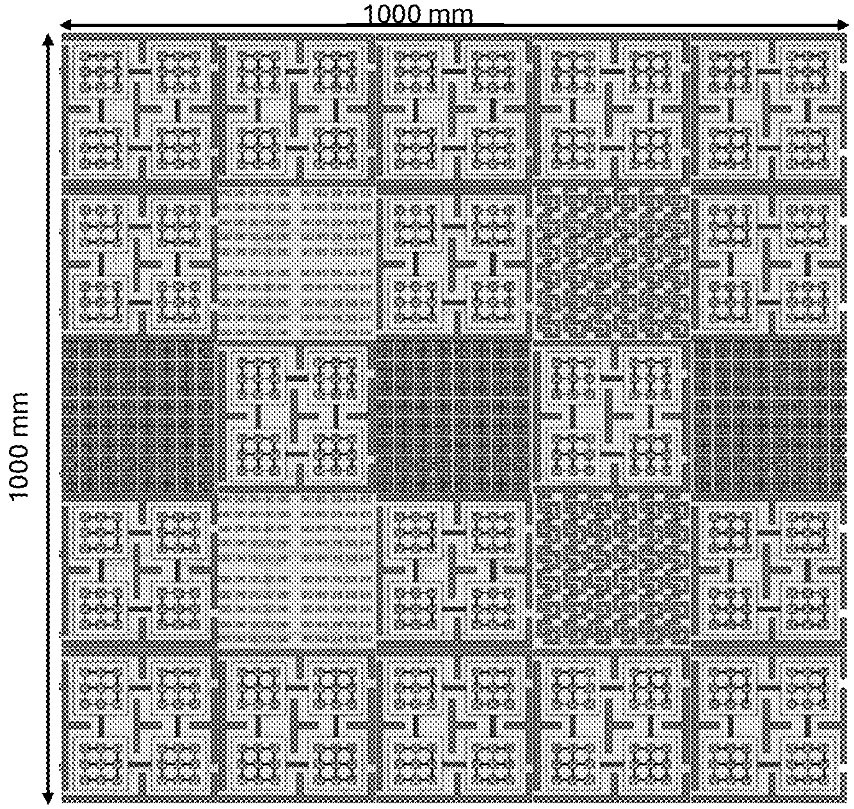
FIG. 1(*a*) shows a visualization of the heterogenous AIA, according to an embodiment of the subject invention.
Figure 1B:
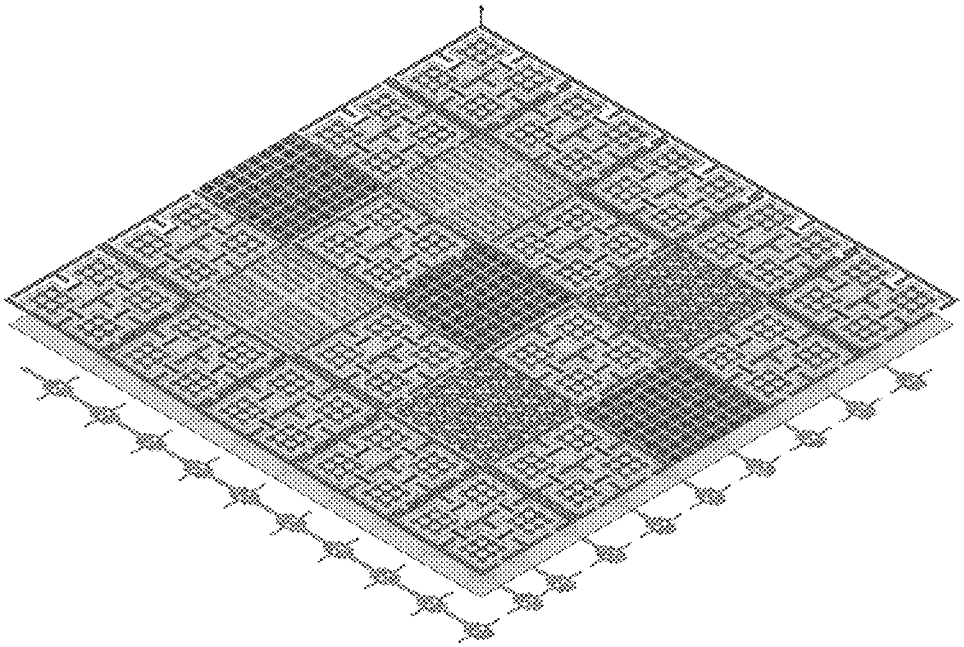
Figure 1D:
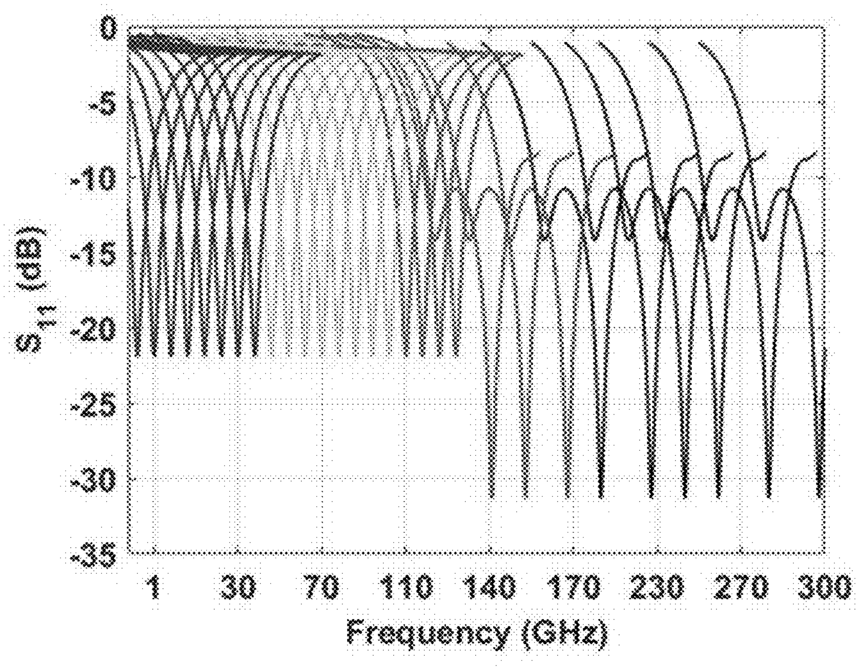
Figure 1E:
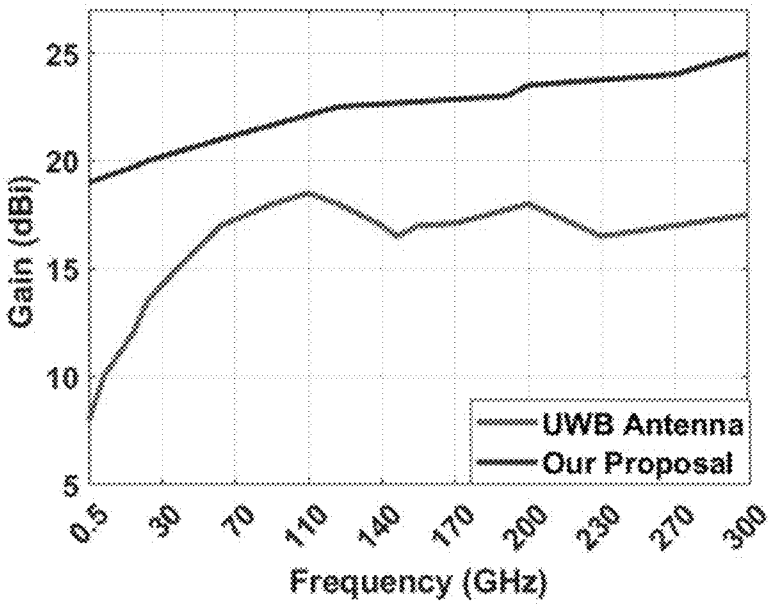

Referring to FIG. 1(*a*), a visualization of an embodiment of the subject invention is presented and the specification of each antenna is presented in FIG. 1(*c*). Moreover, FIG. 1(*b*) shows a 3D view of the visualization of the heterogenous AIA, the performance is depicted in FIG. 1(*d*) and a gain comparison between the AIA antenna of the subject invention and a convention UWB antenna is shown in FIG. 1(*e*).

The antenna system of the subject invention comprises a first reconfigurable, tunable antenna structure that operates from 0.5 to 40 GHz, as depicted in FIG. 2(*a*). The antenna system is designed based on AIA, incorporating a plurality of planar inverted-F antennas (PIFAs), a plurality of square patch antennas, and a plurality of circular patch antennas. The PIFAs are configured to operate in the 0.5 to 4 GHz range, with the PIFA antennas positioned on the structure's edge for 2-4 GHz operation. An integrated aperture tuner (AT) fine-tunes the frequency, while PIN diodes (S1 to S4) connect the plurality of PIFA antennas, effectively tuning the frequency from 0.5 to 2 GHz.

The tuning mechanism expands the frequency band from UHF to 4 GHZ, overcoming the limitations of traditional low-bandwidth antennas at lower frequencies. Moving into the 4 to 10 GHz range, the antenna system incorporates a plurality of square patch antennas, with a single patch dedicated to the 8-10 GHz frequency band. A tunable varactor diode adds a layer of flexibility by adjusting both the antenna loading and the frequency of operation.

Further enhancement is achieved by integrating four square patches with PIN diodes (d1 to d4) as shown in FIG. 2(*a*), expanding the operational range from 4-8 GHz and providing tunability across the broader spectrum from 4-10 GHz. Moreover, a plurality of circular patch antennas are configured to operate in the high-frequency range of 35-40 GHz. Including a slot within the circular patch ensures high bandwidth and the ability to accommodate the demanding frequency range. PIN diodes (C1 to C10) connecting the plurality of circular patch antennas, extending the operational frequency from 10-35 GHz.

Furthermore, the antenna system of the subject invention comprises a second reconfigurable, tunable antenna structure that operates in the frequency range of 40 GHz to 110 GHz and adopts a multilayer stacked-up configuration as shown in FIG. 2(*b*). In particular, a folded antenna with two strip elements is provided. By connecting adjacent strips by the PIN diodes (P1 to P64) as shown in FIG. 2(*b*), the operational range is increased from 90-110 GHz to 40-110 GHz.

In addition, the antenna system of the subject invention comprises a third reconfigurable, tunable antenna structure that operates in the frequency range of 110-170 GHz. For the D-band (110-170 GHz), simpler geometry is preferred due to fabrication tolerances. The third reconfigurable, tunable antenna structure comprises a plurality of square patch antennas comprising Jerusalem cross design as shown in FIG. 2(*c*). The antennas are reconfigurable across the frequency spectrum from 110 GHz to 170 GHz through the integration of PIN diodes (J1 to J64), allowing for dynamic adjustments to meet varying frequency requirements. The antennas may be integrated into a glass substrate, serving as an on-chip antenna element. Glass is selected for its suitability in the D-band, characterized by a very low coefficient of thermal expansion (CTE=9 ppm/C) and an exceptionally smooth surface (rough-ness=300-1000° A) in comparison to other materials such as polymers, silicon, or Teflon. Different organic materials can be utilized.

Moreover, the antenna system of the subject invention comprises a fourth reconfigurable, tunable antenna structure that operates in the frequency range of 170 GHz to 300 GHz. The fourth antenna structure is meticulously engineered using metallic materials, specifically brass. Different subarrays operating at adjacent frequency ranges as shown in FIG. 2(*d*) are integrated, including a first subarray configured to operate within a frequency range of approximately 170 GHz to 200 GHz; a second subarray configured to operate within a frequency range of approximately 200 GHz to 230 GHz; a third subarray configured to operate within a frequency range of approximately 230 GHz to 260 GHz; and a fourth subarray configured to operate within a frequency range of approximately 260 GHz to 300 GHz. The fourth antenna structure comprises horn-like tapered slots. Laser-cutting technology is utilized to fabricate the antenna structure, facilitating the fabrication of the antennas from a thick brass material. Furthermore, a reconfigurable substrate-integrated waveguide (SIW) is employed to feed these antennas.

In preferred embodiments, the PIN diodes are adopted across multiple frequency bands to enable tuning and reconfiguration.

In preferred embodiments, the aperture tuners (ATs) are adopted to expand operational bandwidth for PIFAs from 0.5 GHZ-2 GHz.

In preferred embodiments, the Varactor Diodes are adopted to enable tunability for square patch antennas and circular patch elements.

In preferred embodiments, the substrate-integrated waveguide (SIW) are adopted to optimize the feeding structure for the high-frequency horn-like antennas.

According to the embodiments of the subject invention, a wideband reconfigurable antenna system can comprise a single substrate; a plurality of planar inverted-F antennas (PIFAs) integrated on the substrate, configured to operate within a frequency range of approximately 0.5 GHz to 4 GHz; a plurality of square patch antennas integrated on the substrate, configured to operate within a frequency range of approximately 4 GHz to 10 GHz; and a plurality of circular patch antennas integrated on the substrate, configured to operate within a frequency range of approximately 10 GHz to 40 GHz; wherein the plurality of PIFAs, the plurality of square patch antennas, and the plurality of circular patch antennas are configured in an aperture-in-aperture (AIA) configuration on the single substrate, enabling an operational frequency range of approximately 0.5 GHz to 40 GHz. The substrate can be made of a material such as Rogers 5880 with a dielectric constant of approximately 2.2 and a thickness of approximately 1.5 mm. The wideband reconfigurable antenna system can further comprise at least one PIN diode connecting adjacent PIFAs of the plurality of PIFAs operating in a frequency range of 2 GHz to 4 GHz. The wideband reconfigurable antenna system can further comprise an aperture tuner (AT) coupled to the plurality of PIFAs, configured to tune the operational frequency to a range of approximately 0.5 GHz to 2 GHz. The wideband reconfigurable antenna system can further comprise at least one PIN diode connecting adjacent square patch antennas of the plurality of square patch antennas operating in a frequency range of approximately 8 GHz to approximately 10 GHz. The wideband reconfigurable antenna system can further comprise a tunable varactor diode coupled to the plurality of square patch antennas, configured to tune the operational frequency to a range of approximately 4 GHz to approximately 8 GHz. The plurality of circular patch antennas can include a slot to enhance bandwidth and to accommodate demanding frequency range. The wideband reconfigurable antenna system can further comprise at least one PIN diode connecting adjacent circular patch antenna elements of the plurality of circular patch antenna elements operating in a frequency range of approximately 35 GHz to approximately 40 GHz. The wideband reconfigurable antenna system can further comprise a tunable varactor diode coupled to the plurality of circular patch antenna elements, configured to tune the operational frequency to a range of approximately 10 GHz to approximately 35 GHz. The antenna system can be configured to achieve an ultra-wide frequency ratio greater than 80.

In another embodiment of the subject invention, an extremely wideband reconfigurable antenna system can comprise a single substrate; a plurality of planar inverted-F antennas (PIFAs) integrated on the substrate, configured to operate within a frequency range of approximately 0.5 GHz to 4 GHz; a plurality of square patch antennas integrated on the substrate, configured to operate within a frequency range of approximately 4 GHz to 10 GHz; and a plurality of circular patch antennas integrated on the substrate, configured to operate within a frequency range of approximately 10 GHz to 40 GHz; a plurality of multilayer stacked-up folded antennas with at least two strip elements integrated on the substrate, configured to operate within a frequency range of approximately 40 GHz to 110 GHz; a plurality of square patch antennas comprising a plurality of Jerusalem cross elements integrated on the substrate, configured to operate within a frequency range of approximately 110 GHz to 170 GHz; and a plurality of subarrays of horn-like tapered slot antennas integrated on the substrate, configured to operate within a frequency range of approximately 170 GHz to 300 GHz. The substrate can be made of a material such as Rogers 5880 with a dielectric constant of approximately 2.2 and a thickness of approximately 1.5 mm. The extremely wideband reconfigurable antenna system can further comprise at least one PIN diode connecting adjacent PIFAs of the plurality of PIFAs operating in a frequency range of 2 GHz to 4 GHz. The extremely wideband reconfigurable antenna system can further comprise an aperture tuner (AT) coupled to the plurality of PIFAs, configured to tune the operational frequency to a range of approximately 0.5 GHz to 2 GHz. The extremely wideband reconfigurable antenna system can further comprise at least one PIN diode connecting adjacent square patch antennas of the plurality of square patch antennas operating in a frequency range of approximately 8 GHz to approximately 10 GHz. The extremely wideband reconfigurable antenna system can further comprise a tunable varactor diode coupled to the plurality of square patch antennas, configured to tune the operational frequency to a range of approximately 4 GHz to approximately 8 GHz. The plurality of circular patch antennas can include a slot to enhance bandwidth and to accommodate demanding frequency range. The extremely wideband reconfigurable antenna system can further comprise at least one PIN diode connecting adjacent circular patch antenna elements of the plurality of circular patch antenna elements operating in a frequency range of approximately 35 GHz to approximately 40 GHz. The extremely wideband reconfigurable antenna system can further comprise a tunable varactor diode coupled to the plurality of circular patch antenna elements, configured to tune the operational frequency to a range of approximately 10 GHz to approximately 35 GHz. The extremely wideband reconfigurable antenna system can further comprise at least one PIN diode connecting adjacent multilayer stacked-up folded antennas of the plurality of the plurality of multilayer stacked-up folded antennas operating in a frequency range of approximately 40 GHz to approximately 110 GHz. The extremely wideband reconfigurable antenna array can further comprise a plurality of PIN diodes connecting the plurality of square patch antennas comprising a plurality of Jerusalem cross elements, the PIN diodes being configured to reconfigure the operational frequency range within approximately 110 GHz to 170 GHz. The plurality of square patch antenna comprising a plurality of Jerusalem cross elements can be integrated onto a glass substrate. The plurality of subarrays of horn-like tapered slot antennas can be integrated onto a glass substrate. The plurality of subarrays of horn-like tapered slot antennas can be fabricated by a laser-cutting method from a brass material. The extremely wideband reconfigurable antenna array can further comprise a reconfigurable substrate-integrated waveguide (SIW) to feed the subarray of horn-like tapered slot antennas. The plurality of subarrays of horn-like tapered slot antennas can comprise a first subarray configured to operate within a frequency range of approximately 170 GHz to 200 GHz; a second subarray configured to operate within a frequency range of approximately 200 GHz to 230 GHz; a third subarray configured to operate within a frequency range of approximately 230 GHz to 260 GHz; and a fourth subarray configured to operate within a frequency range of approximately 260 GHz to 300 GHz. Operations of the antenna system can be optimized by machine learning (ML) methods for full spectral diversity up to 300 GHz.

When ranges are used herein, combinations and subcombinations of ranges (e.g., any subrange within the disclosed range) and specific embodiments therein are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A wideband reconfigurable antenna system, comprising:

a single substrate;

a plurality of planar inverted-F antennas (PIFAs) integrated on the substrate, configured to operate within a frequency range of approximately 0.5 GHz to 4 GHz;

a plurality of square patch antennas integrated on the substrate, configured to operate within a frequency range of approximately 4 GHz to 10 GHz; and a plurality of circular patch antennas integrated on the substrate, configured to operate within a frequency range of approximately 10 GHz to 40 GHz;

the plurality of PIFAs, the plurality of square patch antennas, and the plurality of circular patch antennas being configured in an aperture-in-aperture (AIA) configuration on the single substrate, enabling an operational frequency range of approximately 0.5 GHz to 40 GHz, and the plurality of circular patch antennas including a slot to enhance bandwidth and to accommodate demanding frequency range.

2. The wideband reconfigurable antenna system according to claim 1, the substrate being made of Rogers 5880 with a dielectric constant of approximately 2.2 and a thickness of approximately 1.5 mm.

3. The wideband reconfigurable antenna system according to claim 1, further comprising at least one PIN diode connecting adjacent PIFAs of the plurality of PIF As operating in a frequency range of 2 GHz to 4 GHz.

4. The wideband reconfigurable antenna system according to claim 1, further comprising an aperture tuner (AT) coupled to the plurality of PIFAs, configured to tune the operational frequency to a range of approximately 0.5 GHz to 2 GHz.

5. The wideband reconfigurable antenna system according to claim 1, further comprising at least one PIN diode connecting adjacent square patch antennas of the plurality of square patch antennas operating in a frequency range of approximately 8 GHz to approximately 10 GHz.

6. The wideband reconfigurable antenna system according to claim 1, further comprising a tunable varactor diode coupled to the plurality of square patch antennas, configured to tune the operational frequency to a range of approximately 4 GHz to approximately 8 GHz.

7. The wideband reconfigurable antenna system according to claim 1, further comprising at least one PIN diode connecting adjacent circular patch antenna elements of the plurality of circular patch antenna elements operating in a frequency range of approximately 35 GHz to approximately 40 GHz.

8. The wideband reconfigurable antenna system according to claim 1, further comprising a tunable varactor diode coupled to the plurality of circular patch antenna elements, configured to tune the operational frequency to a range of approximately 10 GHz to approximately 35 GHz.

9. An extremely wideband reconfigurable antenna system, comprising:
- a single substrate;
- a plurality of planar inverted-F antennas (PIFAs) integrated on the substrate, configured to operate within a frequency range of approximately 0.5 GHz to 4 GHz;
- a plurality of square patch antennas integrated on the substrate, configured to operate within a frequency range of approximately 4 GHz to 10 GHz;
- a plurality of circular patch antennas integrated on the substrate, configured to operate within a frequency range of approximately 10 GHz to 40 GHz;
- a plurality of multilayer stacked-up folded antennas with at least two strip elements integrated on the substrate, configured to operate within a frequency range of approximately 40 GHz to 110 GHz;
- a plurality of square patch antennas comprising a plurality of Jerusalem cross elements integrated on the substrate, configured to operate within a frequency range of approximately 110 GHz to 170 GHz; and
- a plurality of subarrays of horn-like tapered slot antennas integrated on the substrate, configured to operate within a frequency range of approximately 170 GHz to 300 GHz.

10. The extremely wideband reconfigurable antenna system according to claim 9, further comprising:
- at least one PIN diode connecting adjacent PIFAs of the plurality of PIFAs operating in a frequency range of 2 GHz to 4 GHz; and
- an aperture tuner (AT) coupled to the plurality of PIFAs, configured to tune the operational frequency to a range of approximately 0.5 GHz to 2 GHz.

11. The extremely wideband reconfigurable antenna system according to claim 9, further comprising:
- at least one PIN diode connecting adjacent square patch antennas of the plurality of square patch antennas operating in a frequency range of approximately 8 GHz to approximately 10 GHz; and
- a tunable varactor diode coupled to the plurality of square patch antennas, configured to tune the operational frequency to a range of approximately 4 GHz to approximately 8 GHz.

12. The extremely wideband reconfigurable antenna system according to claim 9, further comprising:
- at least one PIN diode connecting adjacent circular patch antenna elements of the plurality of circular patch antenna elements operating in a frequency range of approximately 35 GHz to approximately 40 GHz; and
- a tunable varactor diode coupled to the plurality of circular patch antenna elements, configured to tune the operational frequency to a range of approximately 10 GHz to approximately 35 GHz.

13. The extremely wideband reconfigurable antenna system according to claim 9, further comprising:
- at least one PIN diode connecting adjacent multilayer stacked-up folded antennas of the plurality of the plurality of multilayer stacked-up folded antennas operating in a frequency range of approximately 40 GHz to approximately 110 GHz; and
- a plurality of PIN diodes connecting the plurality of square patch antennas comprising a plurality of Jerusalem cross elements, the PIN diodes being configured to reconfigure the operational frequency range within approximately 110 GHz to 170 GHz.

14. The extremely wideband reconfigurable antenna array according to claim 9, the plurality of square patch antenna comprising a plurality of Jerusalem cross elements are integrated onto a glass substrate.

15. The extremely wideband reconfigurable antenna array according to claim 9, the plurality of subarrays of horn-like tapered slot antennas being integrated onto a glass substrate.

16. The extremely wideband reconfigurable antenna array according to claim 9, the plurality of subarrays of horn-like tapered slot antennas being fabricated by a laser-cutting method from a brass material.

17. The extremely wideband reconfigurable antenna array according to claim 9, further comprising a reconfigurable substrate-integrated waveguide (SIW) to feed the subarray of horn-like tapered slot antennas.

18. The extremely wideband reconfigurable antenna array according to claim 9, the plurality of subarrays of horn-like tapered slot antennas comprising:
- a first subarray configured to operate within a frequency range of approximately 170 GHz to 200 GHz;
- a second subarray configured to operate within a frequency range of approximately 200 GHz to 230 GHz;
- a third subarray configured to operate within a frequency range of approximately 230 GHz to 260 GHz; and
- a fourth subarray configured to operate within a frequency range of approximately 260 GHz to 300 GHz.

* * * * *